UNITED STATES PATENT OFFICE 2,304,754

LIGHT REFLECTING AND TRANSMITTING ARTICLE

Eugene Wainer, Niagara Falls, N. Y., assignor to The Titanium Alloy Manufacturing Company, New York, N. Y., a corporation of Maine No Drawing. Application February 3, 1941, Serial No. 377,206

3 Claims. (Cl. 260—37)

My invention relates to an improved article of manufacture capable of reflecting yellow light and transmitting blue light, particularly useful in electric light reflectors and in filament delustering.

This application is a continuation-in-part of copending application Serial No. 252,215, filed January 21, 1939.

From the standpoint of efficiency, a light reflecting and transmitting material should absorb or scatter as little of the incident light as possible. In addition, a selective effect between the yellow light toward one end of the spectrum and the blue light toward the other end of the spectrum is extremely desirable. As the human eye is more sensitive to the yellow wave lengths of the visible spectrum than to the shorter blue wave lengths, efforts have been made to develop a material capable of reflecting the maximum amount of yellow light possible and transmitting the maximum amount of blue light possible. In other words, from the standpoint of human consumption, effective glare, working efficiency, and general comfort relative to eye strain and ease of continued use, the best results are obtained when a maximum of yellow light is reflected and only a diffuse blue light is transmitted for illumination of the room proper. Translated into practical usage, this statment means that, in viewing a lamp through a material capable of securing such a selective effect, most of the yellow light is deflected away from the eyes, while the diffuse blue-toned light reaching the eyes is more restful on continued exposure, due to the lower sensitivity of the human eye towards light of such wave length. Likewise, light reaching the object to be viewed by reflection of the yellow wave lengths appears more intense, due to the greater sensitivity of the human eye towards light of such wave length.

The selective sensitivity of the human eye to yellow and blue light can be observed in several ways. For example, it is known that a substantially white reflecting body having a barely noticeable cream or yellow overcast will appear more opaque to the human eye by reflected light than a substantially white reflecting body having a barely noticeable blue overcast, even though it may be shown instrumentally that the two bodies still have the same opacity or reflecting power. Similarly, in viewing a beam of yellow light and a beam of blue light side by side of exactly equal intensity as measured instrumentally, the human eye invariably chooses the yellow beam as being more intense.

It is therefore an object of this invention to provide a material capable of reflecting yellow light and transmitting blue light. Other objects will appear hereinafter.

These objects are accomplished by incorporating in a normally transparent or translucent base a small amount of a substance having a different refractive index than the base and whose particles are limited to between 0.4 and 0.6 micron in size.

In the practice of this invention, this limitation as to particle sizes is of the utmost importance. It has been found that any appreciable quantities of particles outside these size limits will obscure or totally destroy the selective effect desired, and a possible theoretical explanation for this will be given later. For the same reasons, the quantity of the incorporated substance should be relatively small, since excessive crowding of the particles will cause interparticle scattering of the light, thereby obscuring the results desired. The quantity is generally inversely proportional to the thickness of the base through which it is dispersed, although practical considerations, including obscuring of the effect of one particle by another, may cause this inverse ratio to vary slightly. For a base 1 mm. thick, a quantity of incorporated substance of 0.03 to 0.3 per cent by volume has been found to produce excellent results, although some effect is produced with as little as 0.01% or as high as 0.5% by volume. The strongest effect is produced at about .2% by volume. For a base film 0.1 mm. thick, these quantities are approximately 10 times the amounts for a film 1 mm. thick. With thinner films, of course, even larger quantities should be used, but the practical limit is reached when the film is so thin and the quantity of incorporated substance (usually detracting from the strength of the film) so high that the film has insufficient strength. On the other hand, thicker base materials require less incorporated substance. Again, however, a practical limit is reached because of the undesirability of excessively thick bases, which may themselves absorb or scatter light, and because of lack of absolutely perfect distribution of the incorporated substance. For the thinnest films, no more than 25% by volume of pigment should be added, and for the thickest films no less than 0.001%.

In addition to the size and quantity of particles, the color of the incorporated substance should be as close to water white as possible, and the refractive index should be substantially different from that of the base. The shape of the particles should be such that the physical dimensions are substantially equal in all directions, in order that the dimensions in all directions will fall between 0.4 and 0.6 micron. This is obtainable best in the isometric and hexagonal crystal systems, to a lesser extent in the orthorhombic and tetragonal systems, but not normally in the monoclinic and triclinic systems. As few if any substances possess all these characteristics to the greatest possible extent, it is necessary to select substances which may not be quite perfect in some respects. Thus, a substance of good water whiteness and large difference in refractive index from that of the base may crystallize in the orthorhombic or tetragonal systems, but still be the best material from the practical standpoint.

Substances which meet the foregoing required conditions physically, and may be prepared in the proper particle size range, include cerium dioxide, tin oxide, zirconium dioxide, titanium dioxide, thorium dioxide, antimony oxide, columbium oxide, tantalum oxide, and various coprecipitated or complementary precipitated products of these substances with such materials as barium sulfate, calcium sulfate, zinc oxide, lithopone, etc. Various and suitably fired combinations of the above will also serve. For example, a fired combination of zinc oxide, titanium oxide and antimony oxide has the proper physical properties to include it in the desired category, and can be prepared with the proper particle size. A suitably fired combination of titanium oxide, antimony oxide and fluorspar will also serve. Most of these substances can be commercially classed as pigments, or opacifiers for vitreous enamels, etc. For the sake of convenience, they will hereinafter be called pigments, it being understood that this term includes all substances of the required characteristics as to color, index of refraction and particle size, whether or not they are normally classed as pigments.

Of the above substances, zirconium dioxide is one of the most satisfactory from the standpoint of color, refractive index and crystalline form. Zirconium dioxide of the required particle sizes may conveniently be prepared by controlled calcination of specially prepared zirconium dioxide with soda ash until such particle sizes have been attained. The specially prepared zirconium dioxide serving as the starting material is one whose particle sizes are considerably smaller even than 0.4 micron. This specially prepared starting material may in turn be prepared in a number of different ways, such as according to the methods of Patents Nos. 1,618,287 and 1,494,426, or by calcination of pure zirconyl salts, or by calcination of pure zirconium hydrate. Preferably, however, the starting material is prepared as described in the following example, which gives a complete description of a method of preparing a zirconium oxide whose particle sizes are substantially entirely between 0.4 and 0.6 micron.

*Example*

A substantially pure zirconium dioxide is first converted to the sulfate, which is dissolved in water to form a saturated solution. Any soluble iron present is reduced by nascent hydrogen, or zinc metal, or sodium thiosulfate, etc., or by so regulating the original conversion of the zirconium dioxide to the sulfate that an insufficient amount of acid is present to combine with all the oxide, so that all the iron is present as ferrous sulfate. A soda ash solution is added to the properly diluted zirconium sulfate solution (which has been previously clarified), until the precipitate forming no longer dissolves. A solution of potassium sulfate is then added in the ratio of 20 to 50 mols of zirconium dioxide to 1 mol of potassium sulfate, while the addition of soda ash is continued until the solution reaches a pH of 3 to 4, so as to hold back the precipitation of ferrous iron which occurs at pH=5.5. The precipitate is then filtered and washed free of iron and sulfates. The cake is dried and calcined at 1600 to 1800° F. until all acid fumes are eliminated. The process usually requires 8 to 12 hours.

The resulting calcine is suitably disintegrated, and about 6 parts of soda ash is intimately mixed with about 100 parts of the cold calcine. This last mixture is calcined at 1660° to 1700° F., preferably as close to 1680° F. as possible, for a period of time sufficient to produce the proper crystallization as determined by periodic microscopic examinations. The course of the last reaction is as follows: pronounced peptization takes place at first, thereby forming very minute crystals of a size just at or below the limit of resolution of the highest power of the microscope. These crystals serve as nuclei of crystal growth, the growth continuing at an astonishingly uniform rate. The charge is then removed from the furnace as soon as these nuclei grow to 0.5 micron in size. If allowed to continue, the size will continue to increase. On such large particles it can be easily seen that the particles are almost entirely tetragonal or orthorhombic in shape. Normally about 1½ hours is required to complete the proper growth at 1680° F.

The calcine obtained is then cooled, and to every 100 pounds of such calcine is added 15 pounds of 1.16 sp. gr. hydrochloric acid. Water is then added to produce a stirring slurry and the mixture is digested for 12 hours at room temperature. The mixture is then washed twice by settling and decantation, followed by replacement of the water and adjustment of the pH to between 5 and 6 with ammonia water. The material is then filtered and washed free of chlorides, disintegrated in a ball mill in slurry form, and dried. The resulting product is substantially entirely between 0.4 and 0.6 micron in particle size.

As base materials, there should preferably be used a water white material which is normally as transparent as possible. Translucent materials obscure the selective effect of the pigment, so that imperfect results only are attainable. However, under certain conditions slightly translucent materials may be used. In addition to transparency or slight translucency, the base material should not alter the desired physical characteristics of the pigment. Thus, ordinary glass has a tendency to dissolve or otherwise physically alter particles of many of the pigments listed above, particularly at the high temperatures at which glass is smelted. Accordingly, other transparent or slightly translucent materials, such as organic plastic or resinous materials, are preferred. Suitable organic plastics are transparent natural or synthetic resins, such as urea-formaldehyde, methyl methacrylate or other acrylic acid derivative resins, pyroxylin, phenolic base resins, styrene resins, cellulose acetate, and cellulose regenerated from viscose. These materials may vary widely in thickness, from thin films to thick sheets, and may be used either alone, or coated on a suitable transparent or slightly translucent backing sheet such as of glass, or sandwiched between two such backing sheets.

The pigment is incorporated in the base in any suitable fashion, such as by mixing pigment and base (e. g. urea formaldehyde resin) and grinding in a ball mill for a proper length of time, by trituration, or simply by mixing if the particles of the base are sufficiently fine. Such a mixture is usually obtained by grinding. Incorporation of the pigment in a liquid resin may be accomplished by ball-mill grinding, paint-mill grinding, simple mixing, trituration, etc. The mixed material is then molded or made into the form of a sheet or film according to standard procedures, varying according to the particular base employed. Paint or lacquer films are applied by pouring, dipping, brushing, or spraying, and are either allowed to dry at normal temperatures or are baked for specified times and temperatures to produce the desired finished properties. Thermosetting resins are prepared in final form by heating in a mold for definite times and temperatures and then cooled.

As described above, in the preferred form of the present invention a normally substantially transparent synthetic resin is used as the base, and zirconium dioxide as the pigment. With a specific gravity around 5 for the $ZrO_2$, and around 1 for the resin, the quantity of $ZrO_2$ to be added on a weight basis is between 0.05% and 2.5% by weight with a base 1 mm. in thickness. The selective light effects are just noticeable at 0.05% addition by weight, become pronounced at 0.5% addition, and are strongest at 1.0% addition by weight. The effects are rapidly lost at higher additions and become more and more non-selective at amounts above 1.0%. About 2.5% is the upper limit. With the thinner films, of course, the amount will vary accordingly.

The invention having been described, the following theoretical discussion shows the apparent reason for its operability. Selective effects in light reflection and transmission are not unknown, and are usually discussed under such headings as selective absorption or selective transmission. A well known example in which the light transmitted by thin sheets is complementary to that reflected is the case of thin gold leaf, which transmits blue-green light and selectively reflects yellow light at the surface. The Newton's ring experiment is another famous example of the same phenomenon. Such a film illuminated by white light shows a set of concentric colored rings both in reflected and transmitted light with the colors of the two systems complementary at corresponding points. By mathematical application of the laws of interference phenomena, it may be shown that the wave lengths which are suppressed in reflection are reinforced in transmission, while the wave lengths suppressed in transmission are reinforced in reflection. Therefore, the colors transmitted and reflected at any point are complementary. By the same laws of light interference, it can be shown that such decided effects may be obtained with definity and greatest brilliance when the film thickness is 0.0002 mm. to 0.0008 mm., which covers the range of the wave length of visible light. The selective effects disappear at film thickness above 0.0008 mm. and below 0.0002 mm. A further application of these principles is in reflection and diffraction gratings, as discussed in many standard textbooks on optics. None of these applications, however, has any general wide commercial application, because of the expense or lack of durability.

However, the laws which govern these phenomena can be used to explain the present invention. The grating formula for reflection gratings is as follows:

$$n\lambda = 2d \sin \theta$$

where $n$=order of spectrum, $\lambda$=wave length of light, $d$=distance between grating points and $\theta$=angle of incidence and reflection for reflection gratings. Assuming reflection angles between 30° and 45°, first order spectrum, and average wave length for yellow light of 6000 A. U., solving for $d$ gives 0.43 to 0.60 micron. Hence, a particle with boundaries of face separated by 0.43 to 0.6 micron should act as an effective reflector of yellow light and should also transmit or absorb the complementary color blue. A corollary of the above mathematical relationship states that, in order for a crystal or particle or other diffracting medium to reflect light of a certain wave length, it must have a size substantially smaller than that wave length. Conversely, in order for a particle effectively to transmit light of a certain wave length, it must have a size substantially larger than that wave length. A particle of the same size as the entrant light will absorb or deplete that light by internal scattering. Since the blue end of the spectrum has a wave length of 0.4 micron and the yellow end a wave length of 0.6 micron, a particle of 0.5 micron should be most efficient from a theoretical standpoint in transmitting blue and reflecting yellow. As a final check, the best size for reflection of blue light of 0.4 micron can be calculated as 0.28 to 0.4 micron, again showing that the proper particle, if it acts as a diffraction grating, should be above 0.4 micron but below 0.6 micron in size.

The amount of incorporated substance can also be calculated theoretically, but practice in this case varies considerably from theory, because of inevitable variance from perfect dispersion, perfect particle size and perfect particle shape relatively to an incident light beam. Another factor increasing the necessary amount of particles is the masking of the effect of one particle by another. The best effect should be obtained when each 0.5 micron particle is contained exactly in the center of each cubic micron of base. Under such conditions, the amount necessary will be 12.5% by volume per particle. The perfect condition would be no more than one particle per cubic micron in a layer covering a thickness of 1 micron. As thicker bases than this are required in actual practice, the particles will be distributed throughout the thickness of the base, so that the theoretical quantity necessary is then 12.5% divided by the thickness in microns. For a base 1 mm. thick, this quantity is therefore calculated as 0.0125% by volume. As stated above, considerably greater quantities are required in actual practice.

The term "substantially transparent" as used in the present specification and claims is understood to include slightly translucent materials, but not so translucent that the selective effect of the incorporated substance is destroyed.

As many variations are possible within the scope of this invention, it is not intended to be limited except as defined by the appended claims.

I claim:

1. A new article of manufacture capable of reflecting yellow light and transmitting blue light, comprising a normally substantially transparent organic plastic base containing a small quantity of a white substance having particle sizes and dimensions substantially entirely between 0.4 micron and 0.6 micron, said substance having a refractive index substantially different from said base and being substantially uniformly distributed throughout said base, the quantity of said substance being approximately inversely proportional to the thickness of said base, said quantity being between 0.01% and 0.5% by volume for a base one millimeter in thickness.

2. A new article of manufacture capable of reflecting yellow light and transmitting blue light, comprising a normally substantially transparent organic plastic base containing a white substance having substantially equal dimensions in all directions and particle sizes substantially entirely between 0.4 micron and 0.6 micron, said substance having a refractive index substantially different from said base and being substantially uniformly distributed throughout said base, the quantity of said substance being approximately inversely proportional to the thickness of said base, said quantity being between 0.01% and 0.5% by volume for a base one millimeter in thickness.

3. A new article of manufacture capable of reflecting yellow light and transmitting blue light, comprising a normally substantially transparent organic plastic base containing a white zirconium dioxide having particle sizes and dimensions substantially entirely between 0.4 micron and 0.6 micron, said zirconium dioxide having a refractive index substantially different from said base and being substantially uniformly distributed throughout said base, the quantity of said zirconium dioxide being approximately inversely proportional to the thickness of said base, said quantity being between 0.05% and 2.5% by weight for a base one millimeter in thickness.

EUGENE WAINER.